United States Patent
Fukui

(10) Patent No.: US 10,120,559 B2
(45) Date of Patent: Nov. 6, 2018

(54) PORTABLE TERMINAL AND DETERMINATION TIME SETTING METHOD

(71) Applicant: KYOCERA CORPORATION, Kyoto (JP)

(72) Inventor: Yujiro Fukui, Kawanishi (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/969,790

(22) Filed: Dec. 15, 2015

(65) Prior Publication Data

US 2016/0103580 A1    Apr. 14, 2016

Related U.S. Application Data

(63) Continuation of application No. PCT/JP2014/065037, filed on Jun. 6, 2014.

(30) Foreign Application Priority Data

Jun. 25, 2013 (JP) .................................. 2013-132467

(51) Int. Cl.
*G06F 3/048* (2013.01)
*G06F 3/0488* (2013.01)
*H04M 1/67* (2006.01)
*G06F 3/0481* (2013.01)
*G06F 3/0484* (2013.01)
*H04W 12/08* (2009.01)
*G06F 21/74* (2013.01)

(52) U.S. Cl.
CPC ........ *G06F 3/0488* (2013.01); *G06F 3/04817* (2013.01); *G06F 3/04847* (2013.01);
(Continued)

(58) Field of Classification Search
CPC .. G06F 2203/04808; G06F 1/00; G06F 3/048; G06F 3/0481; G06F 3/0484; G06F 3/0487; G06F 3/0488
(Continued)

(56) References Cited

U.S. PATENT DOCUMENTS

2002/0060682 A1* 5/2002 Kohira .................... G06T 15/04
                                                          345/473
2008/0168404 A1* 7/2008 Ording .................. G06F 3/0485
                                                          715/863
(Continued)

FOREIGN PATENT DOCUMENTS

JP    2004-227511    8/2004
JP    2013-085147    5/2013

OTHER PUBLICATIONS

"Android TM 4.1 eno Major Update | Digno Dual (WX04K) | Kyocera", [online], Apr. 15, 2013, [retrieval date Aug. 8, 2014], URL:https://web.archive.org/web/20130415024741/http://www.kyocera.co.jp/prdct/telecom/consumer/wx04k/update/, in 7 pages.
(Continued)

*Primary Examiner* — Roy P Rabindranath
(74) *Attorney, Agent, or Firm* — Duane Morris LLP

(57) ABSTRACT

A portable terminal comprises a display, a touch unit located on a surface of the display and at least one processor. The processor is configured to set a lock state to restrict an execution of a predetermined processing based on a touch operation. The processor is configured to display a lock screen on the display to unlock the lock state with a touch operation on the touch unit when the lock state is set. The processor is configured to detect the touch operation to unlock the lock state on the lock screen. The processor is configured to measure a touch time in the touch operation when the touch operation to unlock the lock state is detected. The processor is configured to set a determination time of a long-press operation in accordance with the touch time.

4 Claims, 9 Drawing Sheets

(52) U.S. Cl.
CPC .......... *G06F 3/04883* (2013.01); *G06F 21/74* (2013.01); *H04M 1/67* (2013.01); *H04W 12/08* (2013.01); *G06F 2203/04808* (2013.01); *G06F 2221/2147* (2013.01); *G06F 2221/2151* (2013.01); *H04M 2250/22* (2013.01)

(58) Field of Classification Search
USPC .................................................. 345/173–174
See application file for complete search history.

(56) References Cited

U.S. PATENT DOCUMENTS

2012/0200515 A1* 8/2012 Yamada ................ G06F 1/1626
　　　　　　　　　　　　　　　　　　　345/173

2013/0120298 A1* 5/2013 Zhou ....................... G06F 3/041
　　　　　　　　　　　　　　　　　　　345/173

OTHER PUBLICATIONS

International Search Report in International Application No. PCT/JP2014/065037, dated Aug. 19, 2014, in 1 page.
"Update de Tsukai Yasuku wa Natta kedo [Digno Dual WX04K]", [online], May 8, 2013, [retrieval date Aug. 8, 2014], Internet,,URL:http://k-tai.impress.co.jp/docs/column/minna/20130508_598304.html, in 3 pages.
Written Opinion of the International Searching Authority in International Application No. PCT/JP2014/065037 and statement of relevance of non-English references therein, dated Aug. 19, 2014, in 5 pages.

* cited by examiner

F I G . 2
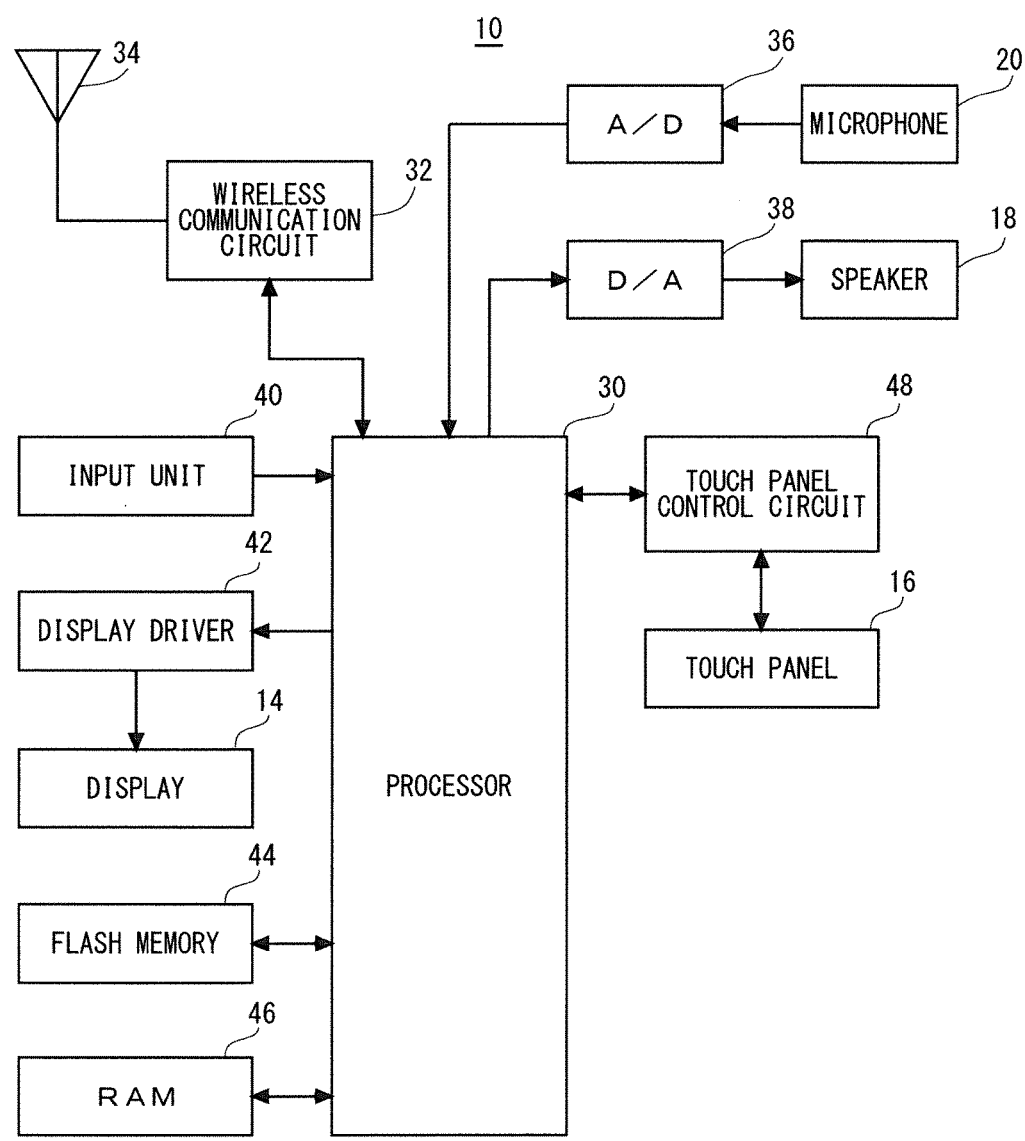

F I G. 3
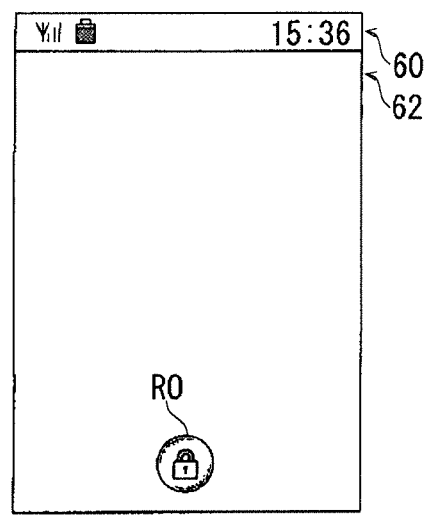

F I G . 1 1
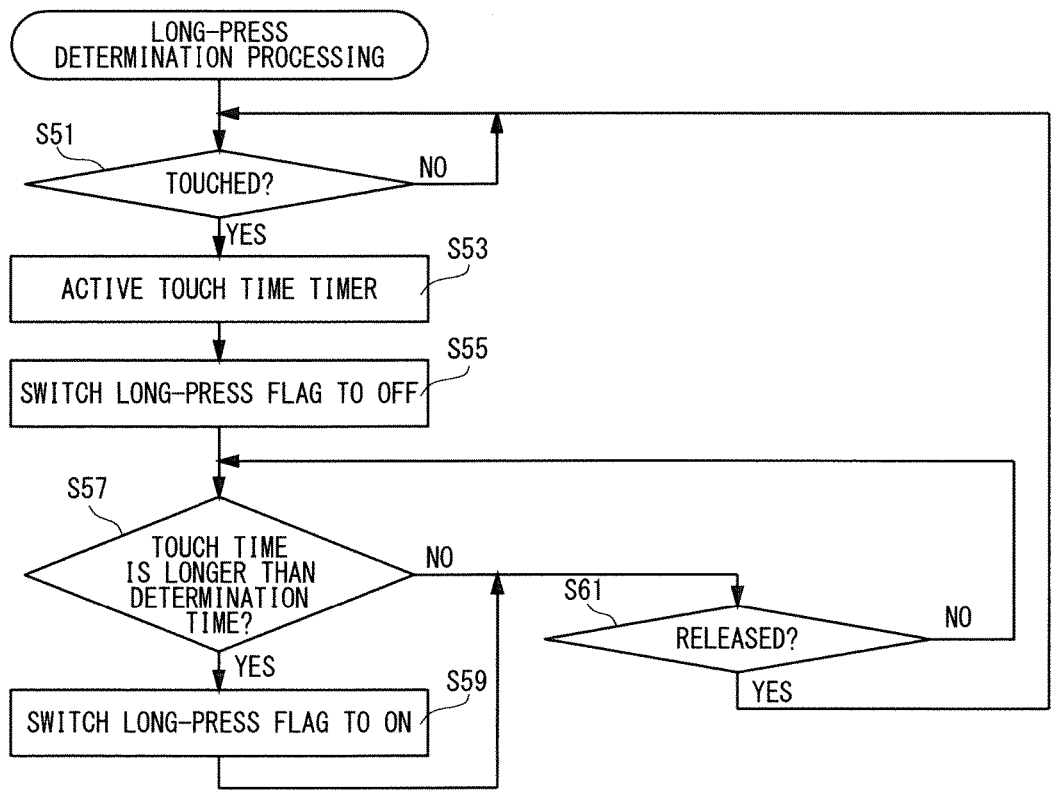

PORTABLE TERMINAL AND DETERMINATION TIME SETTING METHOD

CROSS-REFERENCE TO RELATED APPLICATION

The present application is a continuation based on PCT Application No. PCT/JP2014/065037, filed on Jun. 6, 2014, which claims the benefit of Japanese Application No. 2013-132467, filed on Jun. 25, 2013. PCT Application No. PCT/JP2014/065037 is entitled "PORTABLE TERMINAL AND DETERMINATION TIME SETTING METHOD" and Japanese Application No. 2013-132467 is entitled "PORTABLE TERMINAL, DETERMINATION TIME SETTING PROGRAM, AND DETERMINATION TIME SETTING METHOD," and each are incorporated by reference herein in their entireties.

TECHNICAL FIELD

An embodiment of the present disclosure relates to a portable terminal and a determination time setting method.

BACKGROUND ART

In a conventional mobile phone, a long press of a specified key during a character input with a ten key causes a character, which corresponds to the long press, to be input. A long-press time is arbitrarily set in accordance with operability of a user.

SUMMARY

As embodiments of the present disclosure, a portable terminal and a determination time setting method is disclosed. In one embodiment, a portable terminal comprises a display, a touch unit, at least one processor. The touch unit is located on a surface of the display. The processor is configured to set a lock state to restrict an execution of a predetermined processing based on a touch operation. The processor is configured to display a lock screen on the display to unlock the lock state with a touch operation on the touch unit when the lock state is set. The processor is configured to detect the touch operation to unlock the lock state on the lock screen. The processor is configured to measure a touch time in the touch operation when the touch operation to unlock the lock state is detected. The processor is configured to set a determination time of a long-press operation in accordance with the touch time.

In one embodiment, a portable terminal comprises a display and a touch unit. The touch unit is located on a surface of the display. A processor of the portable terminal executes steps of: setting a lock state to restrict an execution of a predetermined processing based on a touch operation; displaying a lock screen on the display to unlock the lock state with a touch operation on the touch unit when the lock state is set; detecting the touch operation to unlock the lock state on the lock screen; measuring a touch time in the touch operation when the touch operation to unlock the lock state is detected in the detection step; and setting a determination time of a long-press operation in accordance with the touch time measured in the measuring step.

BRIEF DESCRIPTION OF THE DRAWINGS

FIG. 2 illustrates an explanatory diagram showing an electrical configuration of the mobile phone shown in FIG. 1.

FIG. 3 illustrates an explanatory diagram showing an example of a lock screen displayed on a display shown in FIG. 1.

FIG. 4A illustrates an example of a state where a finger touches a lock object, FIG. 4B illustrates an example of a state where the finger is released from the lock object, and FIG. 4C illustrates an example of a screen displayed when a lock state is unlocked.

FIG. 5A illustrates an example of a state where a character is input in the memo pad function, FIG. 5B illustrates a state where a long-tap operation is performed on the screen of the memo pad function, and FIG. 5C illustrates an example of a state where an edit box is further displayed on the screen of the memo pad function.

FIG. 11 illustrates a flow chart showing an example of a long-press determination processing performed by the processor shown in FIG. 2.

DESCRIPTION OF EMBODIMENT

Figure 1:
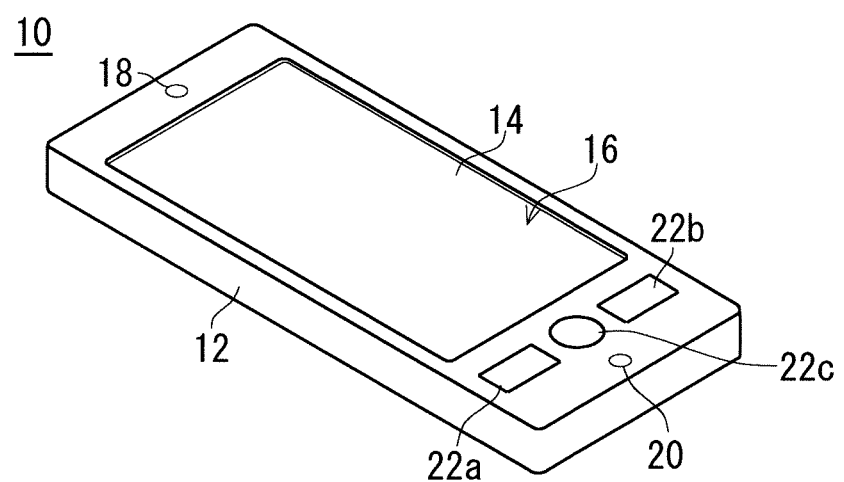
FIG. 1 illustrates an appearance diagram showing a mobile phone according to an embodiment.

With reference to FIG. 1, a mobile phone 10 according to one embodiment is a smart phone as an example and includes a housing 12 having a vertically-long flat rectangular shape. However, it is mentioned in advance that the present disclosure is applicable to arbitrary portable terminals such as a tablet terminal and a PDA.

Located in one main surface (front surface) of the housing 12 is a display 14 of, for example, liquid crystal or organic EL functioning as a display unit. Provided on the display 14 is a touch panel 16 as a touch unit.

The term "unit" as used herein refers to known structures such as hardware, firmware, non-transitory computer-readable media that stores computer-executable instructions, or any combination of these elements, for performing the associated functions described herein. Additionally, various units can be discrete units; however, as would be apparent to one of ordinary skill in the art, two or more units may be combined to form a single unit that performs the associated functions according to various embodiments of the disclosure. Conversely, a single unit may be divided into two or more units that perform respective associated functions according to various embodiments of the disclosure.

Incorporated into one end part in a vertical direction of a main surface side of the housing 12 is a speaker 18, and incorporated into the other end part in the vertical direction of the main surface side of the housing 12 is a microphone 20.

Provided in one main surface of the housing 12 in one embodiment are a call key 22a, a hang-up key 22b, and a menu key 22c as hard keys to constitute an input operation means with the touch panel 16.

For example, a user may input a telephone number by touching dial keys displayed on the display 14 via a touch operation on the touch panel 16 and then start voice communication via an operation of the call key 22a. The user may finish the voice communication via an operation of the hang-up key 22b. The user may turn on and off a power source of the mobile phone 10 via a long press of the hang-up key 22b.

An operation of the menu key 22c allows a menu screen to be displayed on the display 14. In this state, the user may select a menu by touching a soft key, a menu icon, or the like displayed on the display 14 via the touch operation on the touch panel 16 to determine the selection.

With reference to FIG. 2, the mobile phone 10 according to one embodiment shown in FIG. 1 includes a processor 30 called a computer or a CPU or the like. A wireless communication circuit 32, an A/D converter 36, a D/A converter 38, an input unit 40, a display driver 42, a flash memory 44, a RAM 46, a touch panel control circuit 48, and the like are connected to the processor 30.

The processor 30 may control the entire mobile phone 10. In using an entire or part of the program which is preset in the flash memory 44, the program is developed in the RAM 46 (memory module), and the processor 30 operates in accordance with the program in the RAM 46. The RAM 46 is further used as a working region or a buffer region of the processor 30.

The portable terminal includes at least one processor 30 for providing control and processing capability to perform various functions as described in further detail below. In accordance with various embodiments, the at least one processor 30 may be implemented as a single integrated circuit (IC) or as multiple communicatively coupled IC's and/or discrete circuits. It is appreciated that the at least one processor 30 can be implemented in accordance with various known technologies. In one embodiment, the processor 30 includes one or more circuits or units configurable to perform one or more data computing procedures or processes. For example, the processor 30 may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein. In some embodiments, a lock state setting unit, a display control unit, a detection unit, a measuring unit and a setting unit are implemented as computer executable instructions stored in memory, which when executed by processing circuitry contained in the least one processor 30, perform respective processes as described herein. In alternative embodiments, the lock state setting unit, the display control unit, the detection unit, the measuring unit and the setting unit may be implemented as separate IC's or discrete circuits communicatively coupled to the at least one processor 30 for performing the respective functions herein.

The input unit 40 includes the hard keys 22a to 22c (also referred to as a hard key 22 collectively, hereinafter) shown in FIG. 1. Accordingly, the input unit 40 constitutes an operation reception module to receive a key operation of the hard key 22 performed by the user. Data of the hard key operated by the user (the key data) is input to the processor 30.

The wireless communication circuit 32 is a circuit to transmit and receive radio waves for the voice communication, an E-mail, or the like via an antenna 34. In one embodiment, the wireless communication circuit 32 is a circuit for a wireless communication in CDMA system. For example, when the user operates the input unit to instruct a voice transmission (call request), the wireless communication circuit 32 executes a voice transmission processing in accordance with an instruction of the processor 30 and then outputs a voice transmission signal via the antenna 34. The voice transmission signal is transmitted to another person's telephone through a base station and a communication network. Upon completion of a reception processing in another person's telephone, a communication-enabled state is established, and the processor 30 executes a call processing.

The microphone 20 shown in FIG. 1 is connected to the A/D converter 36, and a voice signal from the microphone 20 is input to the processor 30 as a digital voice data via the A/D converter 36. The speaker 18 is connected to the D/A converter 38. The D/A converter 38 converts the digital voice data into a voice signal and then provides the voice signal to the speaker 18 via an amplifier. Accordingly, a voice based on the voice data is output from the speaker 18.

The display 14 shown in FIG. 1 is connected to the display driver 42, and accordingly, the display 14 displays a video or an image in accordance with a video data or an image data output from the processor 30. That is to say, the display driver 42 controls the display of the display 14, which is connected to the display driver 42, in accordance with the instruction of the processor 30. The display driver 42 includes a video memory to temporarily store the image data to be displayed. The display 14 is provided with a backlight having an LED, for example, as a light source, and the display driver 42 controls a brightness and lighting/extinction of the backlight in accordance with the instruction of the processor 30. The display 14 may be implemented using any display technology known in the art such as, for example, light-emitting diode (LED) technologies, organic LED (OLED) technologies, plasma display technologies, etc. . . . , or any combination of these technologies.

The touch panel 16 shown in FIG. 1 is connected to the touch panel control circuit 48. The touch panel control circuit 48 provides voltage necessary for the touch panel 16, for example, and inputs a touch start signal indicative of a start of the user touching the touch panel 16, an end signal indicative of an end of the user touching the touch panel 16, and a coordinate data indicative of a touch position, in the touch panel 16, where the user touches, to the processor 30. Accordingly, the processor 30 may determine, based on the coordinate data, which icon or key displayed on the display 14 the user has been touched.

In one embodiment, the touch panel 16 may be an electrostatic capacitive touch panel to detect a change of electrostatic capacity generated between a surface of the touch panel 16 and an object (operator) such as a finger getting close to the surface. A case that the operator is the finger is described hereinafter as an example. The touch panel 16 detects one or a plurality of fingers touching the touch panel 16. Thus, the touch panel 16 is also referred to as a pointing device. The touch panel control circuit 48 functions as a touch detection module, so that the touch panel control circuit 48 detects the touch operation within a touch effective range in the touch panel 16 and then outputs the coordination data indicating a position of the touch operation to the processor 30. That is to say, the user performs the touch operation on the surface of the touch panel 16, thereby inputting an operational position, an operational direction, and the like to the mobile phone 10.

The touch operation of one embodiment includes a tap operation, a long-tap operation, a flick operation, a slide operation, and the like.

The tap operation indicates an operation to take the finger off (release the finger from) the surface of the touch panel 16 within a short time after bringing the finger into contact with (causing the finger to touch) the surface of the touch panel 16. The long-tap operation, which is also referred to as a long-press operation, indicates an operation to keep the finger in contact with the surface of the touch panel 16 for a determination time D or more. The flick operation indicates an operation to bring the finger in contact with the surface of the touch panel 16 and then flick the finger in an arbitrary direction at a predetermined speed or more. The slide operation indicates an operation to move the finger in an arbitrary direction while keeping the finger in contact with the surface of the touch panel 16 and then release the finger from the surface of the touch panel 16. The above slide operation includes a slide operation to bring the finger into contact with an object displayed on the surface of the display 14 and then moves the object, a so-called drag operation.

In the description below, an operation to release the finger from the surface of the touch panel 16 after the drag operation is referred to a drop operation. Moreover, the term "operation" may be omitted from each term of the touch operation, the tap operation, the long-tap operation, the flick operation, the slide operation, the drag operation, and the drop operation. The object in one embodiment includes an icon, a shortcut icon, a file, a folder to execute a function. As the detection system of the touch panel 16, a resistance film system, an ultrasonic system, an infrared system, an electromagnetic induction system, and the like may also be applied instead of the above electrostatic capacitance system. The touch operation may be performed not only by the finger of the user but also by a stylus pen or the like.

The mobile phone 10 (the processor 30) of one embodiment enables a setting of a lock state to restrict an execution of a predetermined processing based on the touch operation so that a possibility of erroneous operation caused by an input, which is not intended by the user, to the touch panel 16 may be reduced. For example, when the hang-up key 22*b* is operated, a power source of the display 14 and the touch panel 16 is turned off and the lock state is set. At this time, the processor 30 functions as a lock state setting module. When the menu key 22*c*, for example, is operated in this state, the power source of the display 14 and the touch panel 16 is turned on, and then the processor 30 displays a lock screen shown in FIG. 3 on the display 14 so as to become ready to accept an operation to unlock the lock state. At this time, the processor 30 functions as a display control module. The display 14 is automatically turned off and the lock state is set also when the display of the display 14 does not change for a given length of time.

In the lock state of one embodiment, the power source of the display 14 and the touch panel 16 is off until the lock screen is displayed, so that a power consumption of the mobile phone 10 may be suppressed. However, in another embodiment, the touch operation may be canceled out by not turning off the power source of the touch panel 16 and not causing the processor 30 to process the input touch operation.

With reference to FIG. 3, a display range of the display 14 which displays the lock screen includes a state display region 60 and a function display region 62. The state display region 60 displays an icon (pictogram) indicating a radio wave reception state of the antenna 34, an icon indicating a remaining battery level of a secondary battery, and a time. The function display region 62, which may display a current time (not shown), displays a lock object RO on a lower side thereof.

Figure 4A:
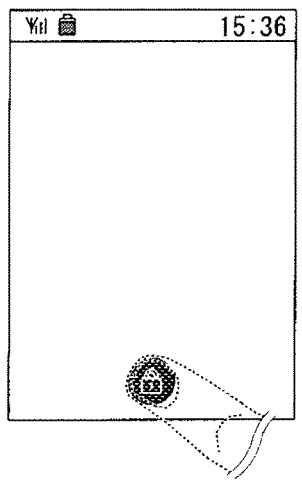
FIG. 4A to 4C illustrate explanatory diagrams showing an example of an operation to unlock a locking state which is set in the mobile phone shown in FIG. 1, in particular.
Figure 4B:
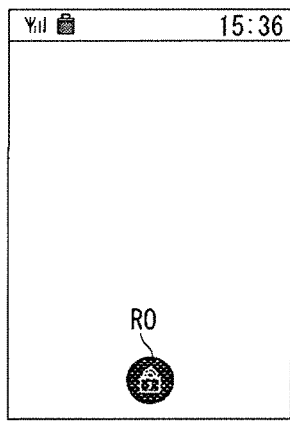
Figure 4C:
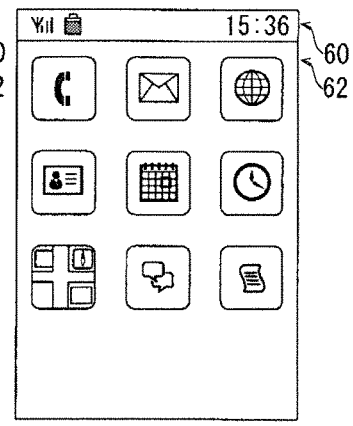

With reference to FIG. 4A to FIG. 4C, when a first predetermined time (0.1 seconds, for example) has passed after the finger touches the lock object RO, the lock object RO is reversed in color. When the finger is released before a second predetermined time (5 seconds, for example) has passed during a state where the lock object RO is revered in color, the lock state is unlocked. When the lock state is unlocked, a home screen is displayed in place of the lock screen. That is to say, the user may unlock the lock state with a tap of the lock object RO.

Since the lock object RO is displayed on a lower center of the display 14, the tap operation on the lock object RO may be performed with either a finger of a hand holding the mobile phone 10 or a finger of the other hand. That is to say, the user may easily unlock the lock state with either left or right hand.

Disposed on the above-described home screen (FIG. 4C) are a plurality of function objects corresponding to a telephone function, a mail function, a browser function, a calendar function, a clock function, a map function, a microblog function, and a memo pad function. The user may execute an arbitrary function with the touch operation on an arbitrary function object among the above function objects.

Figure 5A:
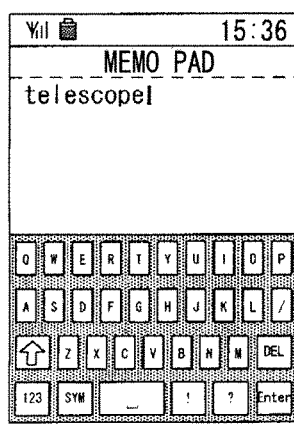
FIG. 5A to 5C illustrate an example of a state where a screen of a memo pad function is displayed on the display shown in FIG. 1, in particular.

With reference to FIG. 5A, for example, when the tap operation is performed on the function object corresponding to the memo pad function (the memo pad object), the memo pad function is executed. In a state where the memo pad function is executed, the function display region 62 is separated into a character display region where an input character is displayed and a key display region where a QWERTY keyboard is displayed. For example, when the user inputs a character string "telescope" on the keyboard, the character display region displays the character string.

Figure 5B:
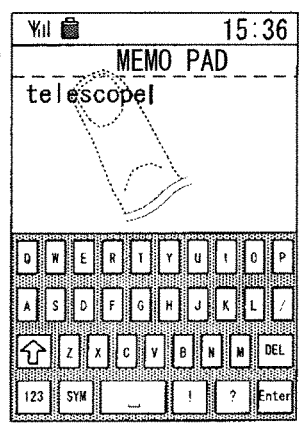
Figure 5C:
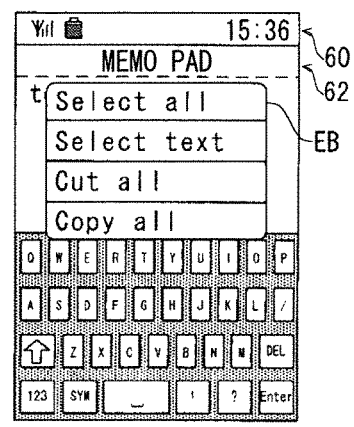

With reference to FIG. 5B, the long tap operation at an arbitrary position in the character input region causes an edit box EB shown in FIG. 5C to be displayed on the display 14. The user may select an arbitrary edit menu in an edit menu included in the edit box EB to select, copy, and cut off a character string displayed on the character input region.

Herein, a touch time of the touch operation differs depending on each user. For example, even when the user performs the touch operation for purpose of the tap operation, the tap operation may be determined as the long-tap operation. Accordingly, in one embodiment, the determination time D to determine the long-tap operation is set using the tap operation to unlock the lock screen, so that the tap operation and the long-tap operation performed by the user may be appropriately determined.

Specifically, a touch time T elapsing from the touch to the release of the finger to/from the lock object RO displayed on the lock screen is measured. At this time, when touch time T is longer than the first predetermined time and shorter than the second predetermined time, the touch time T is stored in the touch time table. Subsequently, an average time A of the touch time T stored in the touch time table is calculated, and a result of adding a correction time ΔT (1 second, for example) to the average time A is set as the determination time D. For example, when the average time A of the touch time T is 1 second, the determination time D is calculated to be a result of adding the correction time ΔT to the average time A, that is to say, "2 seconds".

The determination time D to determine the long-tap operation may be appropriately set using the operation to unlock the lock state in the manner described above. Since the operation to unlock the lock state is used, the determination time D may be set without the user's concern. The tap operation and the long-tap operation performed by the user may be appropriately determined in accordance with the setting of the determination time D.

The determination time D is set in accordance with the average time A of the touch time, so that an accuracy of the determination time D may be enhanced.

Figure 6:
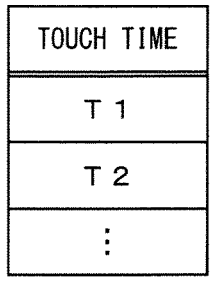
FIG. 6 illustrates an explanatory diagram showing an example of a configuration of a touch time table stored in a RAM shown in FIG. 2.

FIG. 6 illustrates an explanatory diagram showing an example of a configuration of the touch time table. For example, a touch time TN (a natural number is filled in N) is stored every time the lock state is unlocked by the tap operation. When the lock state is unlocked, the average time A is calculated in accordance with the touch time T stored in the touch time table, and then the determination time D is set.

However, when the touch time is longer than the second predetermined time, the touch time is not stored in the touch time table as described above. That is to say, the determination time D may hardly be set in accordance with the touch time of the mistaken touch operation.

When the touch operation caused by, for example, a continuous touch to the lock object RO in a bag occurs, the touch time of the touch operation might be longer than the second determined time. The setting of the determination time D in accordance with the touch time longer than the second predetermined time causes the determination time D to be lengthened. When the determination time D is set in such a manner, it is assumed that the touch operation, which is performed by the user with an intention of performing the long-tap operation, might not be determined as the long-tap operation. However, in one embodiment, a restriction is put on the touch time stored in the touch time table, so that the possibility that the problem described above occurs may be reduced beforehand.

In another embodiment, a restriction may be put on the number of touch times which the touch time table may store. When the number of touch times which the touch time table may store is set to 10, for example, a new touch time is stored after the oldest touch time is deleted to store the new touch time.

The feature of one embodiment is outlined in the above description. One embodiment is described in detail using a memory map shown in FIG. 7 and flow charts shown in FIG. 8 to FIG. 11.

Figure 7:
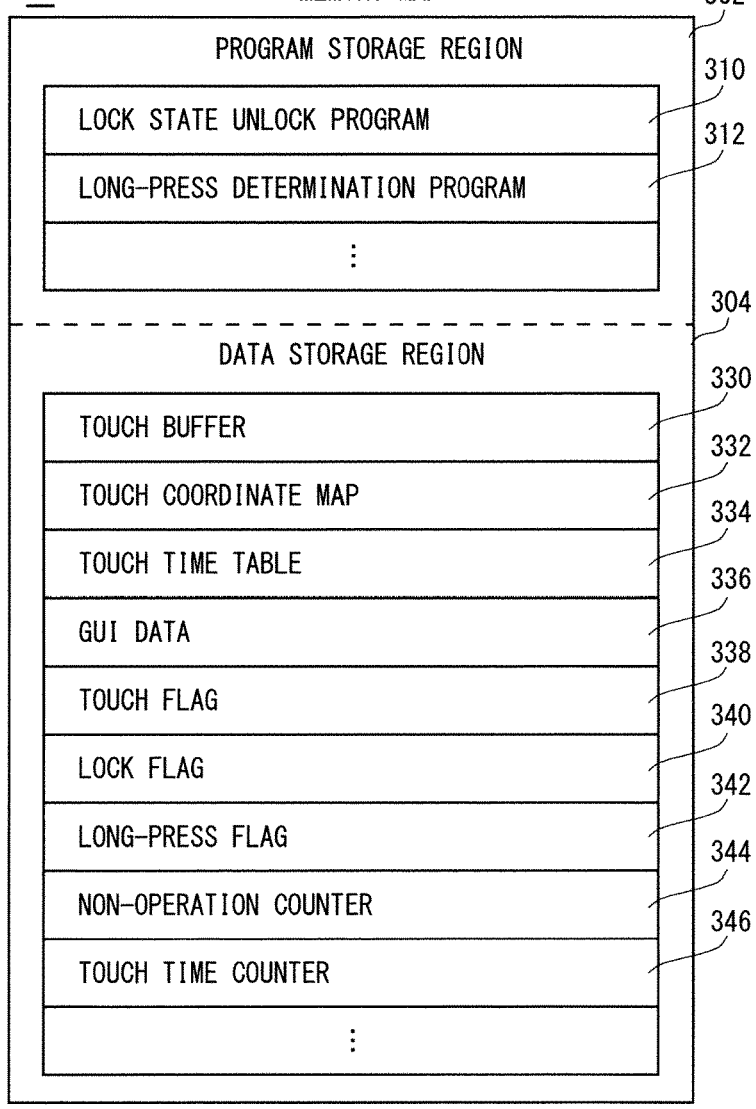
FIG. 7 illustrates an explanatory diagram showing an example of a memory map of the RAM shown in FIG. 2.

With reference to FIG. 7, the RAM 46 shown in FIG. 2 forms a program storage region 302 and a data storage region 304. The program storage region 302 is, as described above, a region to read out and then store (develop) part of or an entire program data which is preset in the flash memory 44 (FIG. 2).

The program storage region 302 stores a lock state unlock program 310 to unlock the lock state and set the determination time D, a long-press determination program 312 to determine whether or not the long-press operation (the long-tap operation) is performed, and the like. The determination time D is set when the lock state unlock program 310 is performed, so that the lock state unlock program 310 is also referred to as a determination time setting program. The program storage region 302 also stores a program to execute the telephone function, the mail function, and the like.

Subsequently, in the data storage region 304 of the RAM 46, a touch buffer 330 or the like is provided, and a touch coordinate map 332, a touch time table 334, a GUI data 336, and the like are also stored. In the data storage region 304, a touch flag 338, a lock flag 340, a long-press flag 342, a non-operation counter 344, a touch time counter 346, and the like are also provided.

The touch buffer 330 temporarily stores data of a touch coordinate outputted by the touch panel control circuit 48.

The touch coordinate map 332 is data which associates the touch coordinate obtained by the touch operation with a display coordinate of the display 14. That is to say, a result of the touch operation performed on the touch panel 16 is reflected in the display on the display 14 in accordance with the touch coordinate map 332. The touch time table 334 is a table having the configuration shown in FIG. 6, for example. The GUI data 336 is data which includes an image and a character string to display a GUI such as the lock object RO or the function object.

The touch flag 338 is a flag to determine whether or not the touch panel 16 is touched. The touch flag 338 is constituted by a 1-bit register. When the touch flag 338 is switched to ON (established), a data value "1" is set to the register. In contrast, when the touch flag 338 is switched to OFF (not established), a data value "0" is set to the register. The touch flag 338 is switched between ON and OFF in accordance with a signal output by the touch panel control circuit 48.

The lock flag 340 is a flag to indicate whether or not the lock state is set. For example, the lock flag 340 is switched to ON in accordance with a processing of turning off the power source of the display 14 and the touch panel 16. The lock flag 340 is switched to OFF when the unlock operation is performed. The long-press flag 342 is a flag to determine whether or not the long-tap operation (long-press operation) is performed. For example, the long-press flag 342 is switched to OFF when the touch is detected, and is switched to ON when the touch operation is determined as the long-press operation. The lock flag 340 and long-press flag 342 have substantially the same configuration as the touch flag 338, so that the detailed description of the configuration is omitted.

The non-operation counter 344 is a counter to measure a time period during which no operation is performed (non-operation time). The non-operation counter 344 starts counting when being reset and expires when a predetermined time (30 seconds, for example) has passed. The touch time counter 346 is a counter to measure the touch time after the touch is detected I the touch panel 16 and starts counting when being reset. The non-operation counter 344 and the touch time counter 346 are also referred to as a non-operation timer and a touch time timer, respectively.

In the data storage region 304, an image data displayed in a standby state, data of the character string, and the like are stored, and a counter, flag, and the like necessary for the operation of the mobile phone 10 are also provided.

Figure 8:
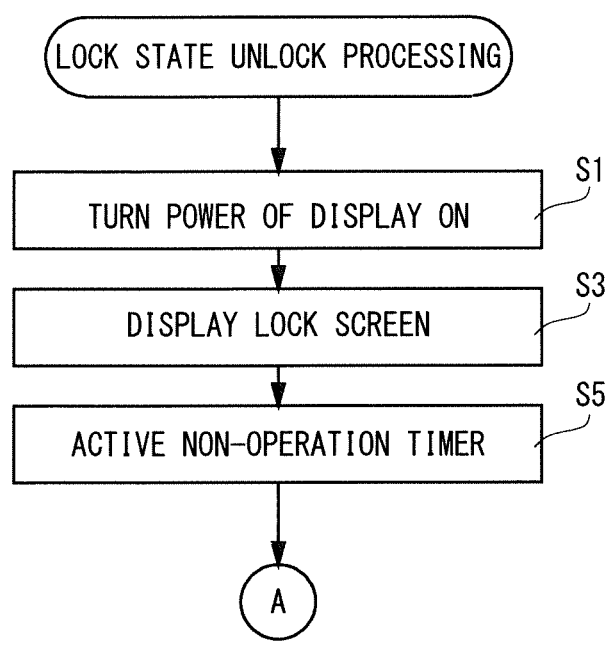
FIG. 8 illustrates a flow chart showing an example of a part of a lock state unlock processing performed by a processor shown in FIG. 2.
Figure 9:
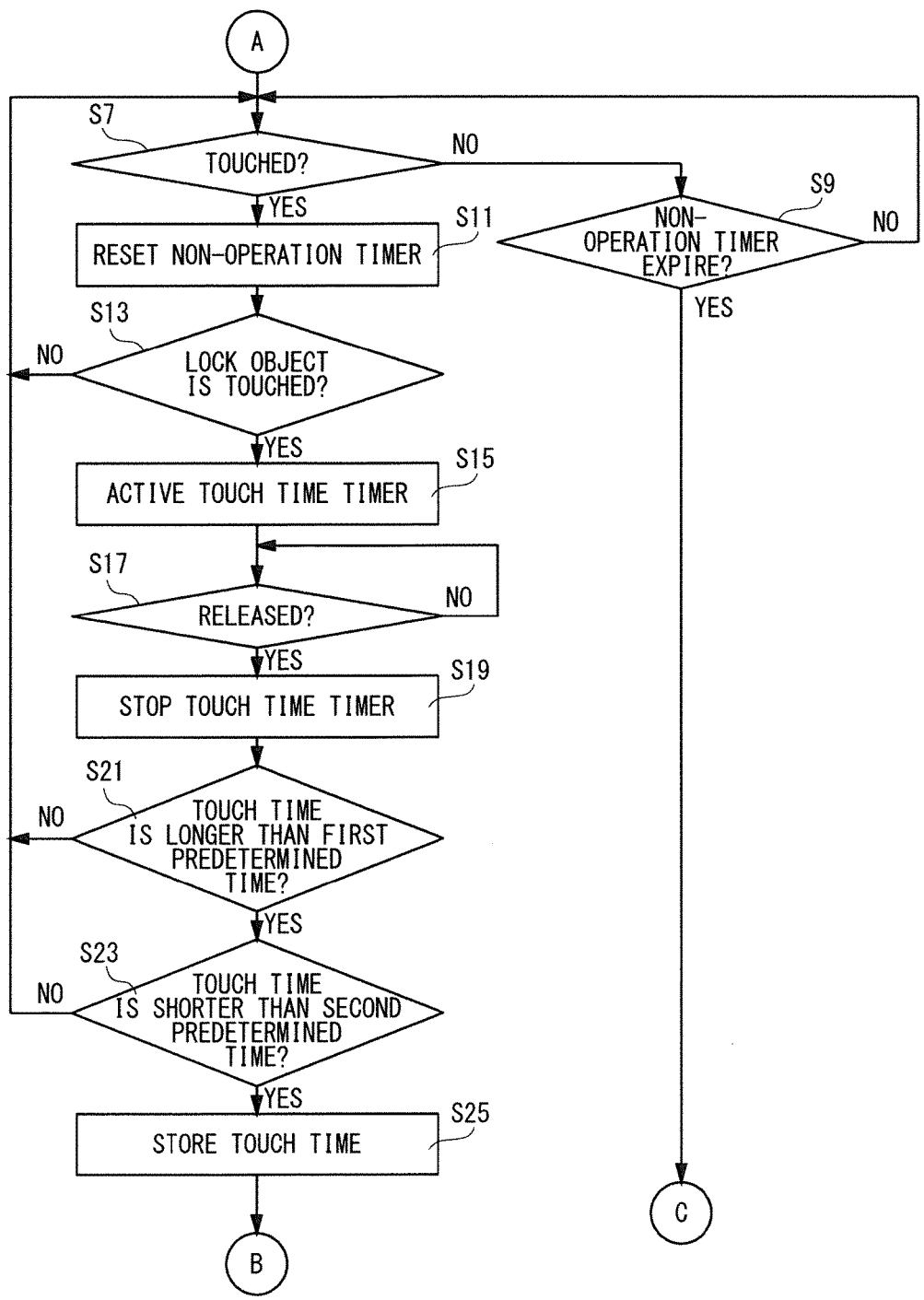
FIG. 9 illustrates a flow chart, which follows FIG. 8, showing an example of another part of the lock state unlock processing performed by the processor shown in FIG. 2.
Figure 10:
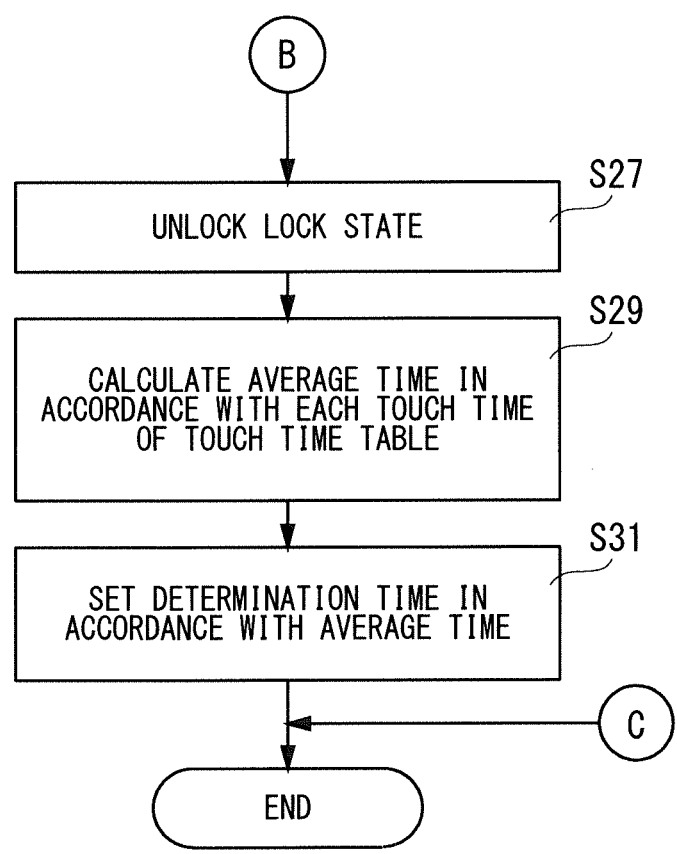
FIG. 10 illustrates a flow chart, which follows FIG. 9, showing an example of still another part of the lock state unlock processing performed by the processor shown in FIG. 2.

The processor 30 concurrently processes a plurality of tasks including the a lock state unlock processing shown in FIGS. 8 to 10, a long-press determination processing shown in FIG. 11, and the like under control of an Android®-based, REX-based, and Linux®-based OS or another OS.

When the hard key 22 (the hang-up key 22b, for example) is operated during the lock state, the lock state unlock processing is executed. In a step S1, the processor 30 turns the power source of the display 14 on. Subsequently, the processor 30 displays the lock screen in a step S3. For example, the processor 30 reads out data necessary for the display of the lock screen to display the lock screen as shown in FIG. 3 on the function display region 62 in the display 14. Subsequently, the processor 30 executes the non-operation timer in a step S5. That is to say, the non-operation counter 344 is reset.

Subsequently, the processor 30 determines whether or not the touch is performed in a step S7. That is to say, the processor 30 determines whether or not the touch flag 338 is ON. When the determination result in the step S7 is "NO", that is to say, when the finger does not touch the touch panel 16, the processor 30 determines whether or not the non-operation timer expires in a step S9. That is to say, the processor 30 determines whether or not a predetermined time has passed without any operation in the state that the lock screen is displayed. When the determination result in the step S9 is "YES", that is to say, when the non-operation timer expires, the processor 30 finishes the lock state unlock processing. In contrast, when the determination result in the step S9 is "NO", that is to say, when the non-operation timer has not expired yet, the processor 30 returns to the processing of the step S7. When the determination result in the step S7 is "YES", that is, for example, when the finger touches the touch panel 16, the processor 30 resets the non-operation timer in a step S11. That is to say, the non-operation time is measured again in accordance with the touch operation.

Subsequently, the processor 30 determines whether or not the finger touches the lock object RO in a step S13. That is to say, the processor 30 determines whether or not the operation to unlock the lock state is performed. The processor 30 which executes the processing of the step S13 functions as a detection module to detect the touch operation, which causes the lock state to be unlocked on the lock screen. When the determination result in the step S13 is "NO", that is to say, when the finger does not touch the lock object RO, the processor 30 returns to the processing of the step S7. In contrast, when the determination result in the step S13 is "YES", that is to say, when the finger touches the lock object RO, the processor 30 activates the touch time timer in a step S15. That is to say, the touch time counter 346 is reset. The processor 30 which executes the processing of the step S15 functions as a measuring module to measure the touch time in the touch operation when the touch operation to unlock the lock state is detected. Subsequently, the processor 30 determines whether or not the finger is released in step S17. That is to say, the processor 30 determines whether or not the touch flag 338 is OFF. When the determination result in the step S17 is "NO", that is, for example, when the finger is not released from the touch panel 16, the processor 30 repeats the processing of the step S17.

In contrast, when the determination result in the step S17 is "YES", that is, for example, when the finger is released from the touch panel 16, the processor 30 stops the touch time timer in a step S19. That is to say, the touch to the lock object RO is finished, so that the measurement of the touch time is finished at that time. Subsequently, the processor 30 determines whether or not the touch time is longer than the first predetermined time in a step S21. For example, the processor 30 determines whether or not the touch operation in which the touch time is shorter than 0.1 seconds is performed with the erroneous operation in the step 21. When the determination result in the step S21 is "NO", that is to say, when the touch time is shorter than the first predetermined time (0.1 seconds, for example), the processor 30 returns to the processing of the step S7. In contrast, when the determination result in the step S21 is "YES", that is, for example, when the touch time is longer than the first predetermined time, the processor 30 determines whether or not the touch time is shorter than the second predetermined time in a step S23. For example, the processor 30 determines whether or not the touch time is shorter than 5 seconds. When the determination result in the step S23 is "NO", that is to say, when the touch time is 10 seconds, the processor 30 returns to the processing of the step S7. In contrast, when the determination result in the step S23 is "YES", that is, for example, when the touch time is 1 second, the processor 30 stores the touch time in a step S25. That is to say, the processor 30 causes the touch time table 334 to store the touch time.

Subsequently, the processor 30 unlocks the lock state in a step S27. That is to say, the processor 30 switches the lock flag 340 to OFF.

Subsequently, the processor 30 calculates the average time A in accordance with each touch time T of the touch time table 334 in a step S29. That is to say, the average time A of the touch time, in performing the tap operation to unlock the lock state, is calculated. Subsequently, the processor 30 sets the determination time D in accordance with the average time A in a step S31. That is to say, a result obtained by adding the correction time ΔT to the average time A is set as the determination time D. When the processing of the step S31 is finished, the processor 30 finishes the processing to unlock the lock state.

The processor 30 which executes the processing of the step S29 functions as a calculation module to calculate the average time of the plural touch times stored in the storage module. The processor 30 which executes the processing of the step S31 functions as a setting module to set the determination time of the long-press operation in accordance with the touch time.

In the step S19, the time measured by the touch time timer may be stored in a buffer memory or the like instead of stopping the touch time timer.

In another embodiment, a message, which prompts a tap to shorten the touch time, may be displayed on the display 14 when the touch time is longer than the second predetermined time.

FIG. 11 illustrates a flow chart of a long-press determination processing. For example, when the power source of the mobile phone 10 is turned on, the processor 30 determines whether or not the touch operation is performed in a step S51. That is to say, the processor 30 determines whether or not the touch flag 338 is ON. When the determination result in the step S51 is "NO", that is to say, when the touch operation is not performed, the processor 30 repeats the processing of the step S51. In contrast, when the determination result in the step S51 is "YES", that is, for example, when the finger touches the touch panel 16, the processor 30 activates the touch time timer in a step S53. That is to say, the touch time counter 346 is reset. Subsequently, the processor 30 switches the long-press flag 342 to OFF in a step S55. That is to say, the long-press flag 342 is set to an initial state (OFF).

Subsequently, the processor 30 determines whether or not the touch time is longer than the predetermined time D in a step S57. That is to say, the processor 30 determines whether or not the touch time measured by the touch time counter 346 is longer than the set determined time D. When the determination result in the step S57 is "YES", that is to say, when the touch time is longer than the determination time D, the processor 30 switches the long-press flag 342 to ON in a step S59 and proceeds to a processing of a step S61. That is to say, the currently-performed touch operation is determined as the long-tap operation. A running application or the like executes a predetermined processing in response to the long-tap operation.

When the determination result in the step S57 is "NO", that is to say, when the touch time is not longer than the determination time D, the processor 30 determines whether or not the release operation is performed in the step S61. That is to say, the processor 30 determines whether or not the finger is released from the touch panel 16. When the determination result in the step S61 is "NO", that is to say, when the finger is not released, the processor 30 returns to the processing of the step S57. In contrast, when the determination result in the step S61 is "YES", that is to say, when the finger is released, the processor 30 returns to the processing of the step S51.

In another embodiment, when the determination result in the step S61 is "YES", the step of stopping the touch time timer may be executed before the processing of the step S51 is performed.

The long-tap operation is applied not only the memo pad function. The long-tap operation may also be performed on the home screen, a browser function screen, or the like. When the long-tap operation is performed on the home screen, for example, the mobile phone 10 enters an edit mode to change a display position of the function objects. When the long-tap operation is performed on the browser function screen, the mobile phone 10 enters a loupe mode to enlarge a character string around the touch position.

In still another embodiment, the determination time D may be set by adding the correction time ΔT to the latest touch time T instead of calculating the average time A of the touch time. Moreover, an initial value may be set as the determination time D to allow the user to arbitrarily reset the setting of the determination time D.

In yet another embodiment, a shortcut icon may be displayed on the lock screen to execute the browser function, the telephone function, or the like upon the release of the lock state. When the shortcut icon is displayed, the touch time of the tap operation on the shortcut icon is also stored in the touch time table 334.

In another embodiment, the lock state may be unlocked by inputting a password instead of tapping the lock object RO. In this case, the touch time T of the tap operation in inputting the password is stored in the touch time table 334.

In still another embodiment, the lock state may be unlocked with the long-tap operation instead of the tap operation. In this case, the average of the touch time stored in the touch time table 334 is directly applied to the determination time D of the long-tap operation. That is to say, in still another embodiment, differing from one embodiment, the correction time ΔT is not added to the average time A.

In yet another embodiment, the determination of the long-tap operation using the determination time D may be used only for a specified application.

The term "longer than the predetermined time" in one embodiment includes "equal to the predetermined time" or "exceeds the predetermined time". Moreover, the term "shorter than the predetermined time" includes "not reach the predetermined time".

The program used in one embodiment may be stored in a HDD of a data distribution server to be distributed to the mobile phone 10 via networks. Moreover, a storage medium which stores the plurality of programs may be manufactured or distributed. The storage medium is for example, an optical disc such as CD, DVD, and BD, an USB memory, and a memory card. When the program downloaded via the above server, the storage medium, and the like is installed on a portable terminal having a configuration equivalent to one embodiment, the effect equivalent to one embodiment may be obtained.

Each of the concrete numerical values described in the detailed description is merely one example, so that the numerical values may be appropriately changed in accordance with a specification change.

The present disclosure has been described in detail, but the above-mentioned description is illustrative in all aspects and the present disclosure is not intended to be limited thereto. Various modifications not exemplified are construed to be made without departing from the scope of the present disclosure.

The invention claimed is:

1. A portable terminal, comprising:
   a display;
   a touch unit configured to detect touch operations on the display; and
   at least one processor configured to set a lock state to restrict an execution of a predetermined processing based on a touch operation, configured to display a lock screen on the display to unlock the lock state with a touch operation on the touch unit when the lock state is set, configured to detect the touch operation to unlock the lock state on the lock screen, configured to measure a touch time in the touch operation when the touch operation to unlock the lock state is detected, and configured to set a determination time of a long-press operation based on an average time of a plurality of touch times of a plurality of respective measured touch operations, wherein the determination time is calculated by adding a predetermined time value to the average time, and wherein the determination time does not depend on a touch time in a touch operation other than the measured touch operations to unlock the lock state.

2. The portable terminal according to claim 1, wherein the portable terminal further comprises a storage configured to store the plurality of touch times measured by the processor and
   the processor configured to calculate the average time of the plurality of touch times stored in the storage, and configured to set the determination time of the long-press operation in accordance with the average time.

3. The portable terminal according to claim 2, wherein when the touch time measured by the processor is longer than a predetermined time, the touch time is not stored in the storage.

4. A determination time setting method in a portable terminal provided with a processor, a display and a touch unit configured to detect touch operations on the display, the method comprising:
   setting a lock state to restrict an execution of a predetermined processing based on a touch operation;
   displaying a lock screen on the display to unlock the lock state with a touch operation on the touch unit when the lock state is set;
   detecting the touch operation to unlock the lock state on the lock screen;
   measuring a touch time in the touch operation when the touch operation to unlock the lock state is detected in the detection step; and
   setting a determination time of a long-press operation based at least in part on the measured touch time measured in the measuring step, wherein the set determination time and an average value calculated from the measured touch time and at least one previously measured touch time have a positive correlation wherein the determination time does not depend on a touch time in a touch operation other than measured touch operations to unlock the lock state.

* * * * *